United States Patent [19]
Colburn et al.

[11] Patent Number: 5,404,384
[45] Date of Patent: Apr. 4, 1995

[54] INVENTORY MONITORING APPARATUS EMPLOYING COUNTER FOR ADDING AND SUBTRACTING OBJECTS BEING MONITORED

[75] Inventors: Eric R. Colburn; Max A. Fedor, both of Pittsburgh; Robert Gillio, Lancaster; Daniel W. Neu, Pittsburgh, all of Pa.

[73] Assignee: MedSelect Systems, Inc.

[21] Appl. No.: 9,055

[22] Filed: Jan. 25, 1993

[51] Int. Cl.⁶ .................................... G06M 3/00
[52] U.S. Cl. ........................ 377/6; 235/385; 364/403
[58] Field of Search ............ 377/6, 9, 53; 235/385; 364/403

[56] References Cited

U.S. PATENT DOCUMENTS

| | | | |
|---|---|---|---|
| 1,478,612 | 12/1923 | Lauke | 377/6 |
| 3,197,620 | 7/1965 | Peltier | 377/6 |
| 4,000,400 | 12/1976 | Elder | 377/6 |
| 4,009,389 | 2/1977 | Lindholm | 377/6 |
| 4,097,725 | 6/1978 | Lieberman et al. | 377/53 |
| 4,122,331 | 10/1978 | Tsubota et al. | 377/6 |
| 4,148,393 | 4/1979 | Wiseman | 377/6 |
| 4,151,402 | 4/1979 | Fernandez et al. | 377/6 |
| 4,356,387 | 10/1982 | Tsubota et al. | 377/6 |
| 4,419,734 | 12/1983 | Wolfson et al. | 364/478 |
| 4,673,915 | 6/1987 | Cobb | 340/568 |
| 4,797,819 | 1/1989 | Dechirot | 377/6 |
| 4,831,638 | 5/1989 | Dabby et al. | 377/6 |
| 4,866,255 | 9/1989 | Sing | 235/385 |

Primary Examiner—John S. Heyman
Attorney, Agent, or Firm—Byron A. Bilicki

[57] ABSTRACT

Inventory monitoring apparatus capable of real-time counting of objects added to or subtracted from a location whose inventory is to be monitored. The apparatus includes structure for supporting a plurality of objects and a lever adapted to be contacted and displaced by movement of the objects to and from the supporting structure. Movement of the lever in one direction triggers a switch which generates a signal indicating that an object is being added to the support structure. Similarly, opposite movement of the lever triggers another switch which generates a signal indicating that an object is being removed from the support structure. A microprocessor receives and counts the signals generated by the switches to provide a real-time total of the quantity of objects borne by the supporting structure.

13 Claims, 3 Drawing Sheets

INVENTORY MONITORING APPARATUS EMPLOYING COUNTER FOR ADDING AND SUBTRACTING OBJECTS BEING MONITORED

FIELD OF THE INVENTION

The present invention relates in general to inventory monitoring apparatus and, in particular, to apparatus for real-time counting of objects.

BACKGROUND OF THE INVENTION

Apparatus for monitoring inventories of consumer goods and other products are known. The broad variety of such apparatus and their myriad modes of operation reflect not only the configurational and dimensional peculiarities of the objects whose inventory or supply is to be monitored but also the purpose for the monitoring, e.g., product identification and tracking, accounting, etc., as well as the manner in which inventory is to be taken, i.e., continuously, periodically, automatically or selectively.

In this regard, U.S. Pat. No. 3,197,620 describes a system for counting moving objects of different dimensions whereby the objects to be counted contact and displace a pivotable rod which is connected to a counting station. The counting station registers the presence of a moving object when the rod is caused to pivot in the proper direction. As a result, only cumulative tallies of objects moving in the appropriate direction are ascertainable. Such a system may be useful in environments where "one-way" counting is all that is desired or necessary. However, in situations where objects to be counted move in opposite directions past a counting station, i.e., when objects are both added and subtracted from a supply, such a one-way counting system would be of no practical use.

U.S. Pat. No. 4,797,819 teaches an inventory monitoring system for counting the quantity of articles suspended from a peg on a sales display. The system comprises an ultrasonic energy emitting and receiving gun which engages with the free end of a peg upon which merchandise is suspended. The distance between the free end of the peg and the nearest article is representative of the number of articles suspended on the peg. A microcomputer within the gun calculates this distance as a function of the time that is required for ultrasonic energy emitted from the gun to reflect from the nearest article and return to the gun. Although sophisticated, this system is readily susceptible to human error. For example, when the operator fails to properly engage the peg, neglects to appropriately orient the articles before counting, or misdirects the gun, accuracy may be detrimentally affected. Moreover, it can only be used for periodic inventory determinations and cannot provide a continuous real-time count of the articles whose inventory is to be monitored.

Systems for counting garment hangers are disclosed in U.S. Pat. Nos. 4,151,402 and 4,831,638. According to each of these references, a count of the number of garment hangers suspended from a rod is determined by moving the hangers past a stationary photosensor or moving the photosensor past a stationary rod from which the hangers depend. Neither of these arrangements can provide a real-time count of the hangers. Each system merely enables one to periodically obtain a total by moving the hangers past the photosensor or vice versa. However, between scannings, one would not know the quantity of hangers that have been added to or removed from the rod.

U.S. Pat. Nos. 4,419,734 and 4,866,255 propose inventory control systems capable of providing inventory monitoring through determination of the weights of article-supporting platforms (U.S. Pat. No. 4,419,734) and article-receiving containers (U.S. Pat. No. 4,866,255). These systems each involve article-bearing structures in operative contact with strain gauges which are, in turn, connected to computers that must perform sophisticated calculations to ascertain the number of articles borne by the article-bearing structures. The complex nature of such systems render them somewhat cost-ineffective for small-scale inventory monitoring in commercial and noncommercial applications.

A key identification and location system is provided in U.S. Pat. No. 4,673,915. The system includes a plurality of key holders, each of which releasably retains a single key that may be accessed by an authorized user. While capable of indicating the presence or absence of a key, the system has no means for counting, either in real-time or periodically, items whose inventory must be monitored.

A need exists, therefore, for an apparatus of uncomplicated design and construction for providing real-time counting of objects added to or subtracted from a location whose inventory is to be monitored.

SUMMARY OF THE INVENTION

The instant invention provides an inventory monitoring apparatus capable of counting in real-time objects added to or subtracted from a location whose inventory is to be monitored. The apparatus preferably includes means for supporting a plurality of objects, lever means adapted to be contacted and displaced by the objects, switch means operatively connected to the lever means for generating registration signals indicative of placement of the objects onto and removal of the objects from the supporting means, and means for counting the objects responsive to registration signals generated by the switch means.

According to a presently preferred embodiment, the inventory monitoring apparatus comprises a housing to which is mounted an object support member such as an elongated peg or rod extending generally longitudinally of the housing. Pivotally mounted within the housing is a lever, a first end of which projects from an opening in the housing. A second end of the lever is connected to a suitable biassing means such as a spring, or the like, whereby the lever is normally biassed to an inoperative position extending generally transversely to the object support member. The lever is constructed and arranged such that its first end protrudes from the housing for a distance sufficient to be contacted and displaced by an object which may be either added to or removed from the object support member. Preferably, the first end of the lever is provided with a notch adapted to receive the object support member such that contact with the lever is assured as an object passes thereby along the object support member. After an object has contacted, displaced and passed the lever (in either direction) the biassing means returns the lever to the inoperative position.

Situated within the housing is a printed circuit board including switch means adapted to generate signals indicative of placement of objects onto and removal of objects from the object supporting member. In cooperation with the switch means, the lever carries suitable actuator means for causing the switch means to generate the appropriate counting signals. Desirably, the actuator means is a permanent magnet and the switch means are magnetic Hall Effect sensors that are triggered by detection of the magnetic field produced by the permanent magnet. Hence, when the lever is caused to pivot in one direction, the permanent magnet triggers one of the magnetic field detection switches to generate a signal indicating that an object has been placed onto the object support member. Likewise, when the lever is oppositely pivoted, the permanent magnet triggers another of the magnetic field detection switches to generate a signal indicating that an object has been removed from the object support member.

The circuit board also includes a microprocessor for receiving and counting the registration signals as they are generated by the switch means. The apparatus may be either AC or DC powered, although DC power is preferred. In this connection, the apparatus preferably further includes a multiple function ribbon cable in communication with the circuit board, which cable possesses both power and data transmission lines. That is to say, the circuit board may receive power from a remote power source via certain lines of the ribbon cable while other lines thereof simultaneously transmit the real-time count being tallied by the microprocessor to a remote display station where the count can be visually monitored. It is also possible that separate power and data transmission cables can be used to in place of the ribbon cable. Moreover, the housing itself may be fitted with a visual display means in addition to or in lieu of the remote display station.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
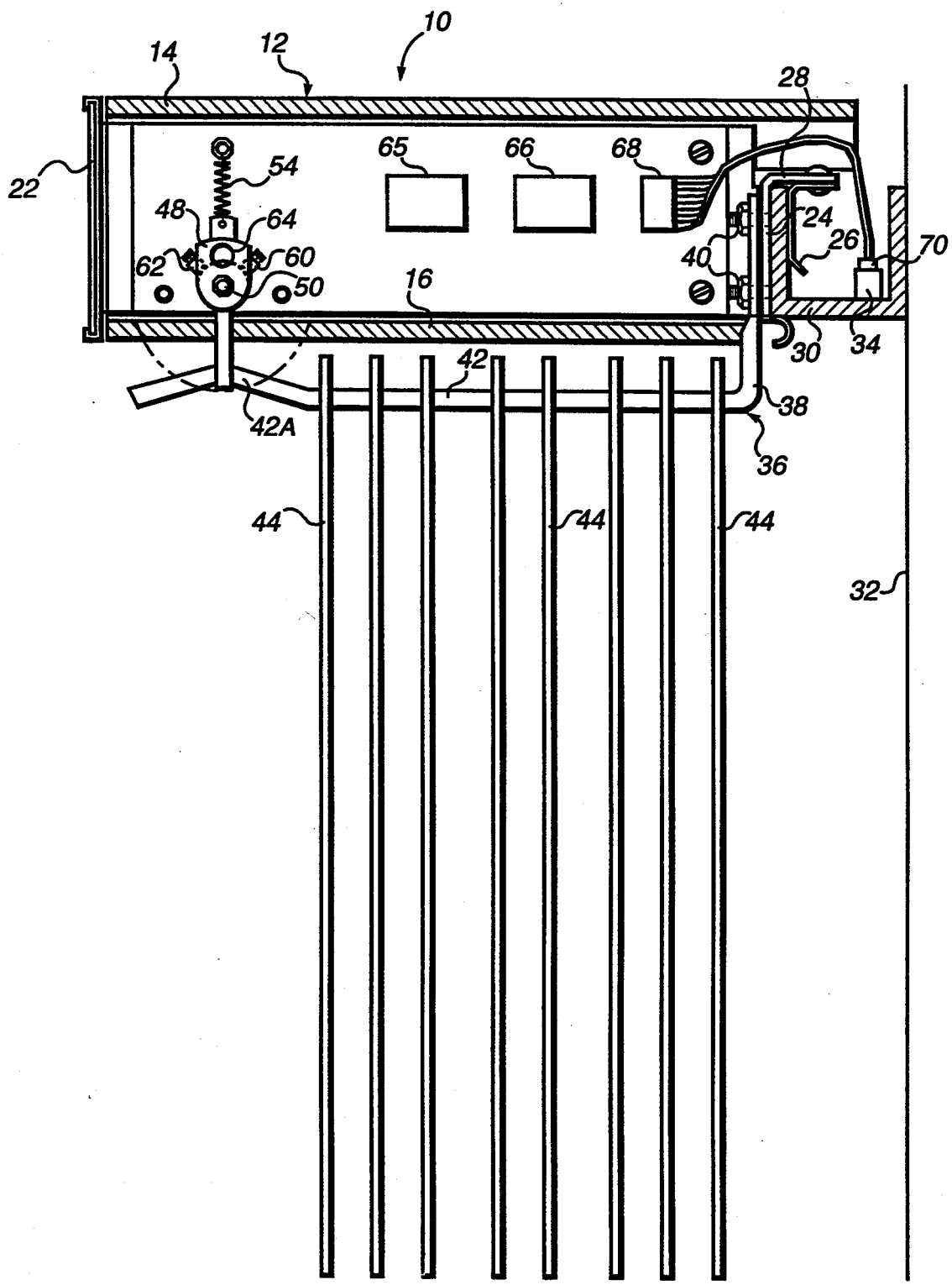
FIG. 1 is a side elevation view of an inventory monitoring apparatus constructed in accordance with a preferred embodiment of the present invention wherein a housing side wall has been omitted for clarity of illustration.
Figure 2:
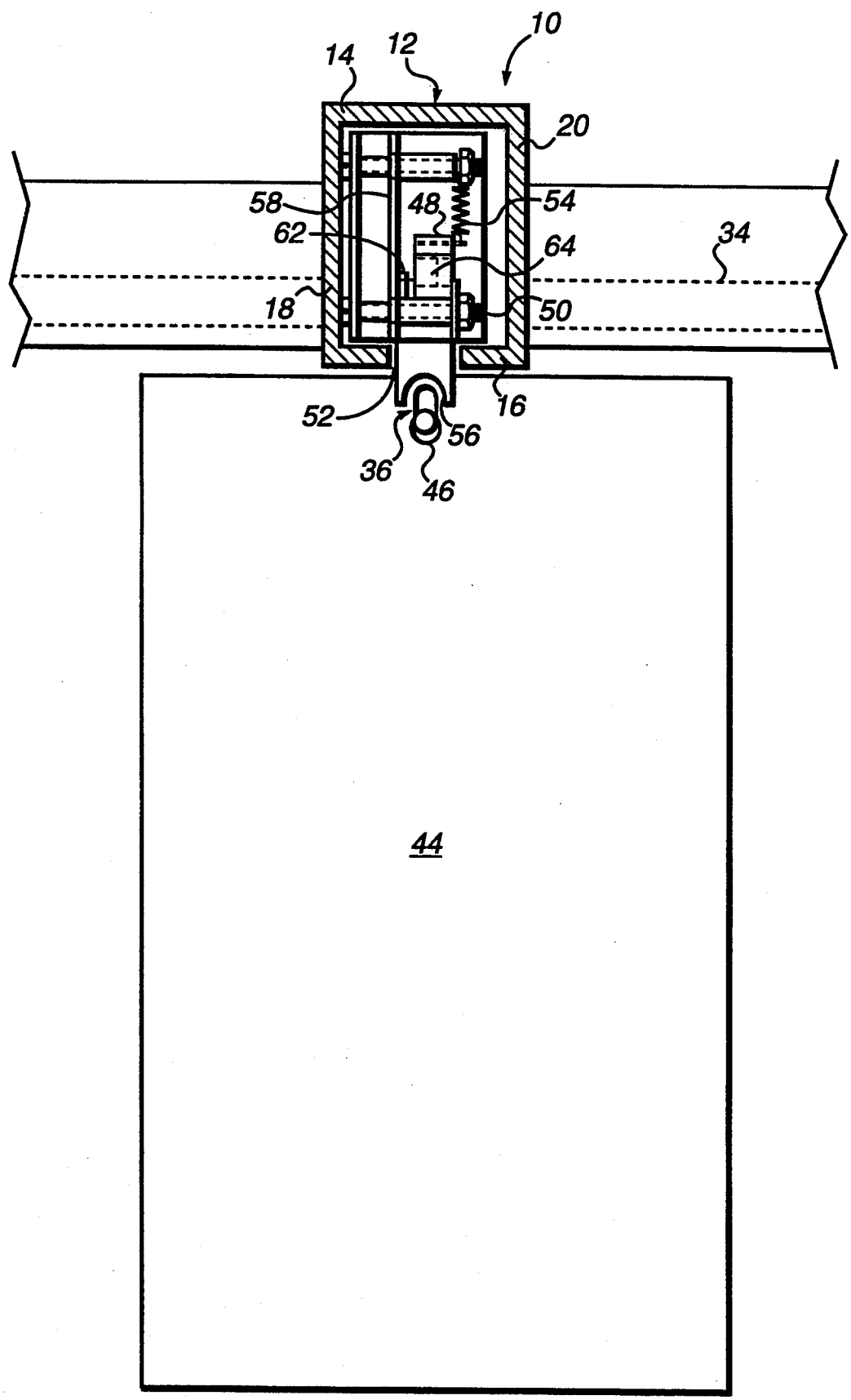
FIG. 2 is front and elevation view of the inventory monitoring apparatus shown in FIG. 1 wherein the housing front wall has been omitted for clarity or illustration.

Referring to FIGS. 1 and 2, there is depicted a presently preferred embodiment of the inventory monitoring apparatus of the instant invention, which apparatus is generally designated by reference numeral 10. Apparatus 10 comprises an elongated housing 12 including an upper wall 14, a lower wall 16, side walls 18 and 20, a front wall 22 and a rear wall 24. Housing 12 may be formed of any suitable durable material such as plastic or metal. A clip assembly 26 or a similar attachment mechanism is desirably carried by a flange 28 of rear wall 24 whereby the housing may be detachably fastened to a rail or similar support structure 30 affixed to a wall 32, or like surface. As will be discussed in greater detail hereinafter, rail 30 may also carry a communications bus 34 or other suitable means for electrically connecting the apparatus 10 to similar apparatus or to a remote computer or display station.

An object support means is designated by reference numeral 36. As is illustrated, the object support may assume the form an elongated, rigid and angled rod which may be suitably formed of metal or plastic. A shorter leg 38 of the object support means 36 is affixed, such as by threaded fasteners 40, to the rear wall 24 of housing 12. A longer leg 42 of the object support means 36 extends generally longitudinally of the housing 12 and is capable of supporting a plurality of objects 44. Thus, according to the preferred embodiment, object support means 36 resembles an elongated peg or rod which suspends objects 44 from perforations 46 (FIG. 2) provided therein. The longer leg 42 also desirably is formed with a raised portion 42A to prevent the objects from unintentionally sliding off of the object support means. It will be appreciated apparatus 10 will find beneficial usage with any articles or objects which are suitable for suspension and whose inventory it is desirable to monitor. Typical items may include packages containing drugs or medical equipment supplies such as, for example, catheters and guide wires for angioplasty, or other articles whose inventories should be strictly and accurately monitored because of theft, safety or related concerns. In this connection, the object support means may assume any form necessary to properly support the objects to be monitored. That is, the object support means may be configured as a rack, multiple hooks or pegs or similar cantilevered member(s), a T-bar, or other such constructions.

A switch activating means 48, desirably configured as a pivotable lever, is mounted generally at its midpoint to housing 12 by pivot pin 50. A first end of lever 48 projects through an opening 52 in lower housing wall 16. A second end of the lever 48 is connected to suitable biasing means 54. For present purposes, a tension spring (as is shown) has been found to be appropriate to impart the necessary biasing force to the lever. As the practitioner will readily appreciate, the biasing means such as torsion springs, compression springs, elastomeric means, or the like, can be effectively used to affect the same result. Biasing means 54 normally biases the lever into an "inoperative" position extending generally transversely to the longer leg 42 of the article support means 36 as depicted in FIG. 1.

It is important that the first end of lever 48 sufficiently project from housing 12 whereby it may be contacted and displaced by an object 44 which may be either added to or removed from the object support means 36. To assure that the lever will interfere with passage of an object, the first end is desirably provided with a notch 56 configured to receive the longer leg 42 of the object support means 36. So assembled, after an object has contacted, displaced and passed the lever (in either direction) the biasing means 54 returns the lever to the inoperative position.

A printed circuit board 58 is affixed to the interior of housing 12. Apart from certain circuitry components specifically identified below which are essential to provide an adequate appreciation of the operation of the instant invention, it will be understood that, as is conventional, circuit board 58 includes printed circuitry and other circuitry components, which components are not illustrated for purposes of clarity.

Electrical switch means are supported by and electrically connected to the circuit board 58. During operation, the switch means generate signals indicative of placement of objects onto and removal of objects from the object support means 36. The presently preferred embodiment of the instant invention utilizes a pair of switch elements 60 and 62 as the electrical switch means. Most preferably, the switch elements are Hall effect sensors which change states (off-to-on) when a magnetic field is detected within close proximity. Accordingly, the lever 48 carries a suitable actuator means in the form of a compact permanent magnet 64 whose magnetic field is capable of being sensed by switches 60 and 62 to effect changes in their status. The signals indicating changes in the status of the switches are detected by a signal processing circuit 65 which converts the signals to an appropriate form to be received and counted by a microprocessor 66 described in greater detail hereinafter.

Figure 3:
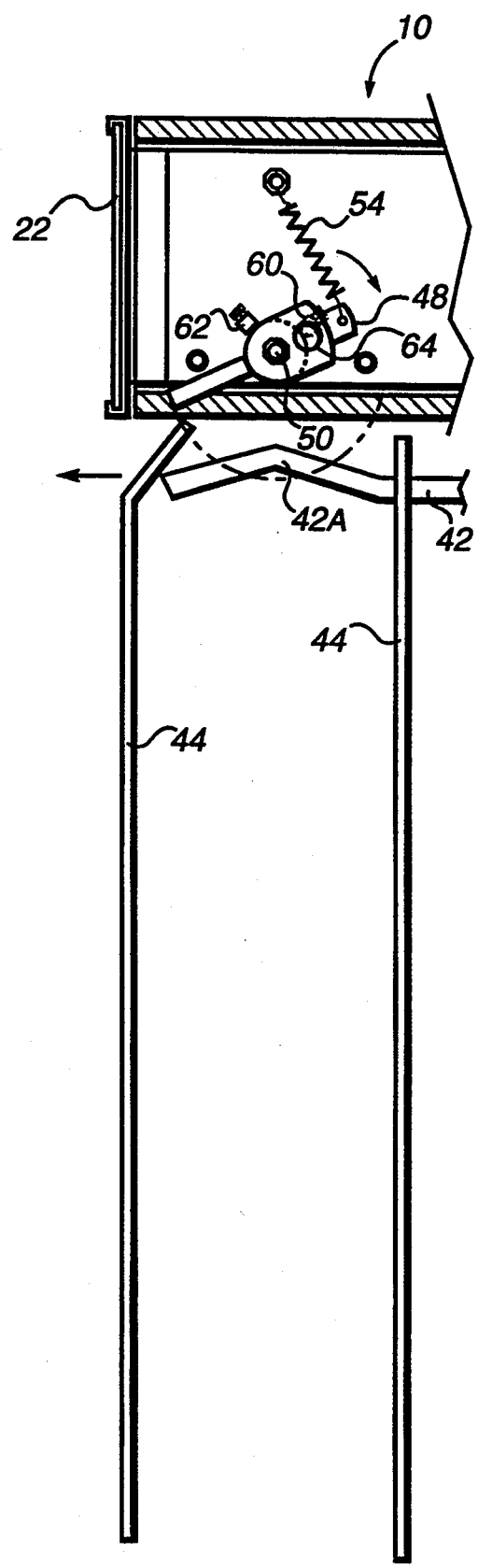
FIG. 3 is a view similar to FIG. 1 depicting an article being removed from the inventory monitoring apparatus.

Operation of the inventory monitoring apparatus 10 is graphically represented in FIG. 3. Specifically, an object 44 is shown at the instant in time when it has fully deflected the lever 48 against the force of biassing means 54 and has just passed the first end of the lever. At this moment, the permanent magnet 64 is pivoted into substantially facing relationship with magnetic field detector switch 60. Switch 60 is triggered upon detection of the magnetic field of the permanent magnet to generate a signal indicating that an object has been removed from the object support means 36. In the next instant in time the biassing means returns the lever to the inoperative position. Similarly, when an object is placed onto the object support member, the lever is oppositely pivoted, thereby causing the permanent magnet to trigger the magnetic field detection switch 62 to generate a signal indicating that an object has been added to the object support means. Although magnetic field detection switches are presently preferred, other suitable switches such as a three-way toggle switch, photosensitive switches, capacitive or inductive sensors, and the like, may be employed to effect generation of the additive and subtractive article registration signals. Likewise, the switch activating means may assume forms other than a pivotable lever, e.g., a linearly reciprocable lever or a flexible flap.

A microprocessor 66 (FIG. 1) receives through a suitable signal processing circuit 65 the signals generated by the switches 60 and 62. The microprocessor contains software programs which record the state of the switches each time a change is detected, and counts and stores the number and direction of changes in state as they occur.

The electronic circuitry of the inventory monitoring apparatus 10 also has the ability to communicate its count information to another computer system. In this regard, software is provided in both the circuit board 58 and the external computer system to establish a protocol whereby the apparatus 10 can transmit its data in an orderly fashion when other such apparatus and devices are attached to the same computer system. Data is digitally encoded and transmitted in a manner that is similar to a standard local area network. To effect the desired data transmission the apparatus 10 preferably additionally includes a multiple function ribbon cable 68 in communication with the circuit board 58. Cable 68 advantageously possesses both power and data transmission lines and is fitted at its free and with an electrical coupling 70 which is configured to couple with communications bus 34. In this manner, circuit board 58 may receive power from a remote, typically DC, power source (not illustrated) via bus 34 and certain lines of the ribbon cable 68 while other lines of cable 68 simultaneously transmit the real-time count being tallied by the microprocessor 66 to bus 34 and, ultimately to the external computer system or to a remote display station where the count can be visually monitored. As will be appreciated, separate power and data transmission cables may be suitably employed in lieu of ribbon cable 68.

Among other design variations, the housing 12 may include a visual display means such as an LCD or LED display in addition to or in lieu of the remote display station. Further, although the presently preferred embodiment finds the apparatus 10 being powered by remote DC power, it is also contemplated that the apparatus may also function under local DC power, including a battery contained within housing 12, or by an AC power source. Additionally, the electronics need not be located within the housing. For example, a circuit board such as board 58 could be located remotely housing with wires connecting the switches 60 and 62 to the circuit board. There also need not be any object support means. Hence, the apparatus 10 may be appropriately dimensioned and positioned in an area access way such that ingress to or egress from the area necessitates displacement of switch activating means 48 to trigger the aforesaid registration signals.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Apparatus for real-time counting of objects added to or subtracted from a location whose inventory is to be monitored, said apparatus comprising:

sensor means for generating an addition signal indicative of an object being added to said location and a subtraction signal indicative of an object being subtracted from said location, said sensor means being operable to detect movement of an object in one direction to generate said addition signal and movement of an object in a generally opposite direction to generate said subtraction signal;

means operatively connected to said sensor means for counting said signals generated by said sensor means to provide a real-time total of said objects at said location; and means including an elongated rod for supporting said objects, said means for supporting said objects serving as said location.

2. The apparatus of claim 1 wherein said means for supporting objects is an elongated rod.

3. The apparatus of claim 1 wherein said sensor means comprise first means for generating said addition signal and second means for generating said subtraction signal.

4. The apparatus of claim 3 further comprising means for actuating said first and second means, said actuating means being situated for contact by said objects and displaceable into first and second positions by movement of said objects to and from said location, whereby in said first position said actuating means actuates said first means and in said second position said actuating means actuates said second means.

5. The apparatus of claim 4 wherein said actuating means is a lever.

6. The apparatus of claim 5 wherein said lever is pivotally supported by said apparatus.

7. The apparatus of claim 5 wherein said first means and said second means comprise magnetic field detection switches and said lever includes a magnet suitable to operate said switches.

8. The apparatus of claim 7 wherein said counting means is a microprocessor.

9. The apparatus of claim 5 further comprising means for biassing said lever against displacement into said first and second positions.

10. The apparatus of claim 5 further comprising means for supporting objects, said means for supporting objects serving as said location.

11. The apparatus of claim 10 wherein said means for supporting objects is an elongated rod.

12. The apparatus of claim 11 wherein said lever includes a notch for receiving said rod.

13. Apparatus for real-time counting of objects added to or subtracted from a location whose inventory is to be monitored, said apparatus comprising:
   sensor means for generating an addition signal indicative of an object being added to said location and a subtraction signal indicative of an object being subtracted from said location, said sensor means being operable to detect movement of an object in one direction to generate said addition signal and movement of an object in a generally opposite direction to generate said subtraction signal;
   means operatively connected to said sensor means for counting said signals generated by said sensor means to provide a real-time total of said objects at said location; and
   means including a rack for supporting said objects, said means for supporting said objects serving as said location.

* * * * *